United States Patent
Muramoto et al.

(10) Patent No.: US 6,175,843 B1
(45) Date of Patent: Jan. 16, 2001

(54) METHOD AND SYSTEM FOR DISPLAYING A STRUCTURED DOCUMENT

(75) Inventors: Takahide Muramoto; Toshimitsu Suzuki; Kazumi Saito; Sadao Yashiro, all of Akashi; Masatomo Goto, Kako-gun, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/075,835

(22) Filed: May 12, 1998

(30) Foreign Application Priority Data

Nov. 20, 1997 (JP) .................................................. 9-318807

(51) Int. Cl.[7] .............................. G06F 15/00; G06F 17/00
(52) U.S. Cl. .......................... 707/513; 707/526; 707/529
(58) Field of Search .................................... 707/513, 517, 707/500, 526, 501, 528–530, 1, 100–102; 345/433, 141, 342, 352, 507, 192; 709/200, 203, 201

(56) References Cited

U.S. PATENT DOCUMENTS 5,708,806 * 1/1998 DeRose et al. ...................... 707/104
5,838,906 * 11/1998 Doyle et al. .......................... 709/202
5,860,073 * 1/1999 Ferrel et al. .......................... 707/522
5,907,837 * 5/1999 Ferrel et al. .............................. 707/3

* cited by examiner

*Primary Examiner*—Joseph H. Feild
*Assistant Examiner*—Alford W. Kindred
(74) *Attorney, Agent, or Firm*—Staas & Halsey, LLP

(57) ABSTRACT

The present invention reads structured information previously obtained through analysis of a structured document and determines whether the input structured information provides information regarding structure elements (and showing the structure of the structured document) or provides content information. When the structured information provides information for structure elements, then style definition information required for display or printing is obtained and compared with corresponding display attribute information. When the style definition information and the display attribute information do not match, the style definition information is set to a buffer area for use by a display or printing apparatus, thereby to realize a high speed display or printing operation.

22 Claims, 5 Drawing Sheets

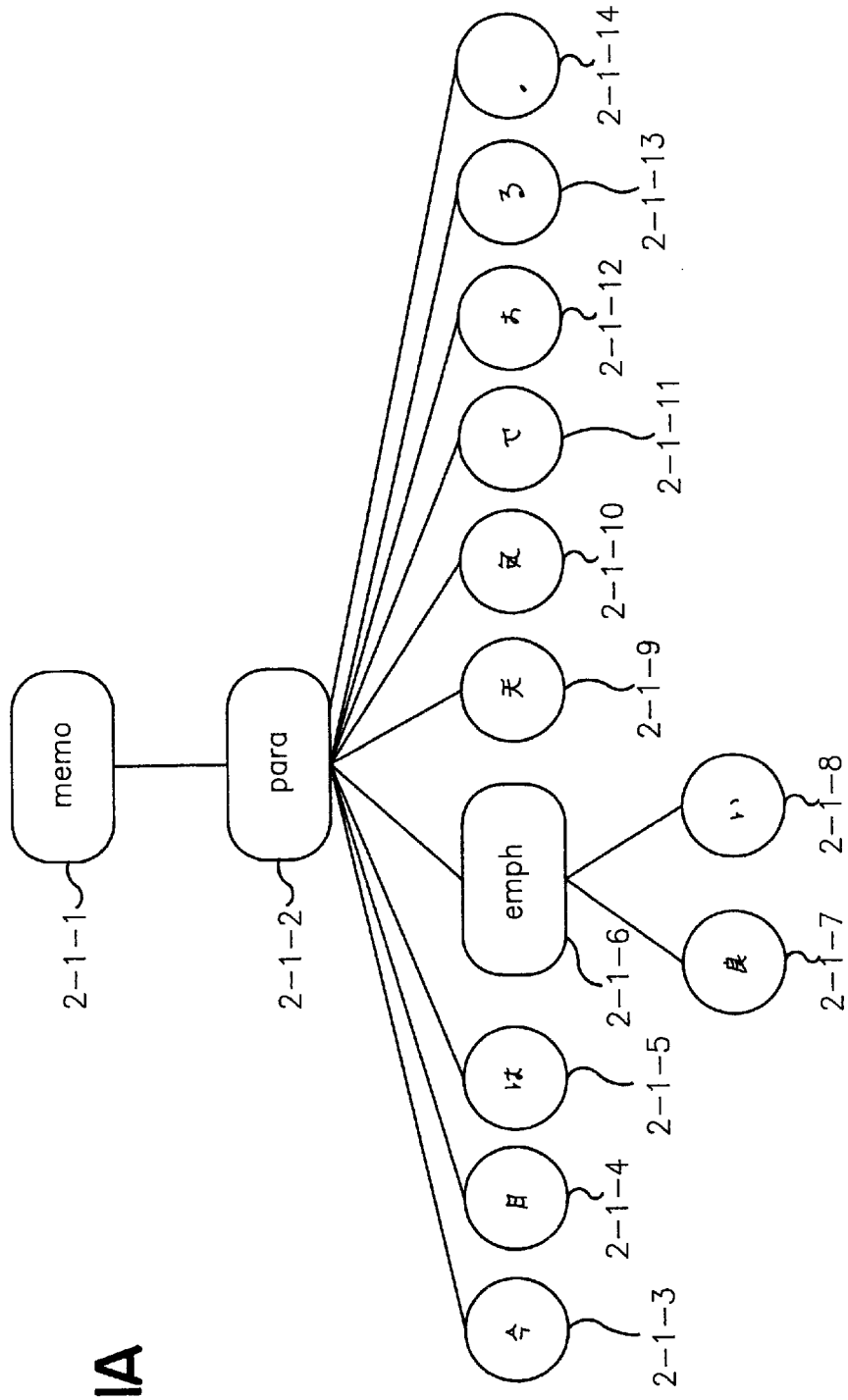

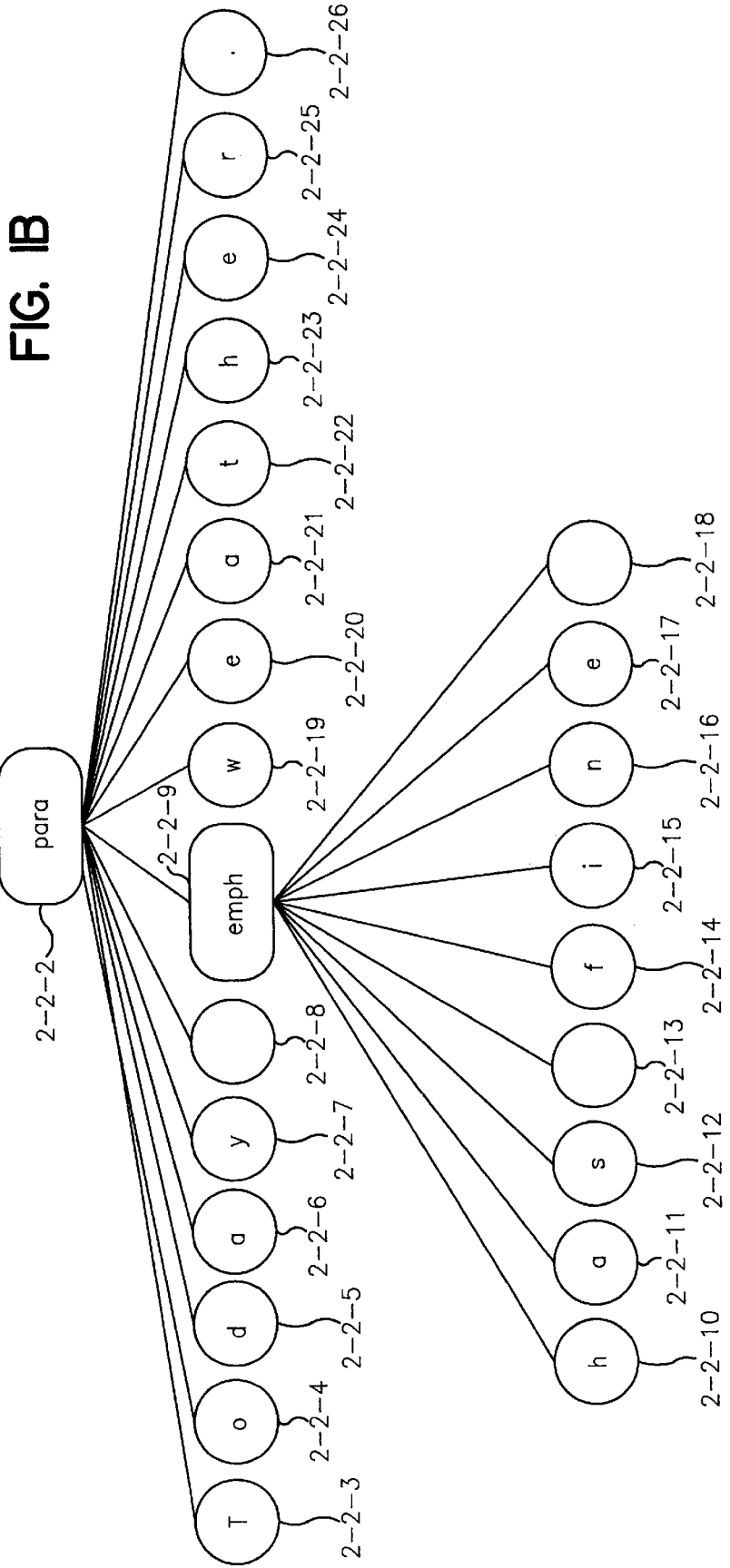

D2 ↓

| Node Name | Character Attribute Element Name and Value Being Stored |
|---|---|
| memo | font-size: 12pt<br>font-bold: FALSE<br>font-facename: GOTHIC |
| para | font-facename: MINCHO |
| emph | font-bold: TRUE |

FIG. 3

| Character Attribute ElementT Name | Meaning |
|---|---|
| font-size | Character size is designated by point |
| font-bold | Bold or not is designated by bool value<br>True.... for output in bold<br>False.... output not in bold |
| font-facename | Facename is designated by character string |

FIG. 6

METHOD AND SYSTEM FOR DISPLAYING A STRUCTURED DOCUMENT

CROSS-REFERENCE TO RELATED APPLICATIONS

This application claims the benefit of Japanese Application No. 9-318807, filed Nov. 20, 1997 in Japan, which is hereby incorporated by reference.

BACKGROUND OF THE INVENTION

The present invention relates to a method and system for displaying a structured document formed of predetermined elements, and particularly to a method and system for displaying a structured document at a high speed.

DESCRIPTION OF THE RELATED ART

A structured document formed of predetermined elements, such as a document described by the Standard Generalized Markup Language (SGML), is structured only by content and structure. The definition information regarding a style for the document, such as format and attribute information required for display, is defined and administered independently of the document content information.

To display such a structured document on a displaying apparatus, or to print the document on a printing apparatus, information about the structure of the document ("structure information") is first analyzed and separately defined information about style definition ("style definition information") is obtained. The style definition information depends on the analyzed structure and, once obtained, is set as display or print attribute information.

The result of such a structure analysis may be represented in a tree structure. The independently defined style definition information is often defined in relation to a set of identifiers (hereinafter referred to as "tags") that indicate the elements of the document structure in terms of the various units of the document.

FIG. 1A shows an example of a structured document. The structured document of FIG. 1A includes text content for a statement in Japanese Kanji. FIG. 1B shows a similar document with text content for an equivalent statement in English. The document of FIG. 1A is analyzed for structure and structure information having a tree structure, as shown in FIG. 2A, is formed. Similarly, the document shown in FIG. 1B is analyzed and information in the tree structure shown, in FIG. 2B, is formed. In the tree structures shown in both FIGS. 1A and 2B, each tag is disassembled into a name for the corresponding document unit, and characters within the larger units are disassembled into units of one character each. Each unit is called a "node." In the present invention, particularly, a unit with character data is represented by the following terms: a "node having character data," or a "character data node."

The style definition information, related to the structure information, as shown in FIG. 3 for the document of FIGS. 1A and 2A, is obtained, and set as display or print attribute information. The structured document is then displayed on an object display apparatus.

To display the structured document, the tree structure generated by the foregoing structure analysis is followed from the upper nodes to the lower nodes. When a node having character data is reached, the tag for the upper node thereof is followed inversely to obtain the attribute information required for display. That is, the operation traces the tree structure backward through the upper nodes, for the node having character data, to obtain the style definition information that is independently defined through the respective node names of the upper node tags. The style definition information is then output to the display apparatus as the attribute information for display of the document.

In the tree structure shown in FIG. 2A, for example, this display process follows the tree from the node 2-1-1 having the tag "memo," to the node 2-1-2 having the tag "para," to the node 2-1-3 having character data representing the particular Kanji character data illustrated in node 2-1-3. Similarly, the tree structure of FIG. 2B is followed from the "memo" node 2-2-1, to the "para" node 2-2-2, to the character data node 2-2-3 having the English character data "T."

In either case, the attribute information required for display of the character (i.e., the character at node 2-1-3 or node 2-2-3) on the display apparatus is obtained by performing the process inversely to the nodes in the upper direction. In FIG. 2A, the tree is first followed back to the node 2-1-2 having the tag "para." The corresponding style definition information, as shown in FIG. 3, is then obtained using the tag "para" as a key (font facename: MINCHO). This style definition information then set in a display buffer area.

The attribute information for the tag "para" is defined only as a font-type (font-facename). Therefore, the tag of the next succeeding upper node is searched next in order to obtain information about font-size and font-bold, which is then set to the display buffer area. That is, the tree of FIG. 2A is followed inversely up to the node 2-1-1, having the tag "memo," to obtain the information about font-size and font-bold which are subsequently set in the display buffer area. The attribute information set in the display buffer area is then used for actual display of the document on the display apparatus. This inverse process must be repeated each time the tree-following process reaches a node having character data.

The inverse following process is repeated as many times as the number of nodes having character data in the document tree structure of FIG. 2A (or FIG. 2B). Namely, in the example of the structured document of FIG. 2A, the operation explained above is repeated 11 times. For the corresponding English document of FIG. 2B, the operation is repeated 23 times. This number of repetitions increases in proportion to the number of characters in the document. When the document information includes a large amount of character data, display of the document requires a correspondingly long amount of time.

A particular case to be considered is Computer-Aided Acquisition and Logistical Support (CALS), a paperless process for management of and transactions with documents over an electronic medium in conformity with a unified specification such as SGML. Initially, CALS was applied mainly to paperless processing of technical documents such as manuals and specifications. Recently, CALS has been applied to the entire range of industrial endeavors, including manufacturing and business activities. This expanded field of application is symbolized by revision of the regular name for CALS to "Continuous Acquisition and Lifecycle Support" and moreover to "Commerce At Light Speed."

Accordingly, an urgent demand has developed for systems and methods with improved operational ability in processing structured documents described in conformity with a unified specification such as SGML.

SUMMARY OF THE INVENTION

It is therefore a particular object of the present invention to improve the display speed for display of structured documents.

Additional objects and advantages of the invention will be set forth in part in the description that follows and, in part, will be apparent from the description or may be learned by practice of the invention.

The present invention provides a method of performing structured document display. The method comprises a step of detecting, from structure information corresponding to a structured document, a node having a tag indicating a node name for the node. The method also includes a step of comparing at least a first portion of style definition information with at least a second portion of display attribute information when a display attribute changing flag indicates that a display attribute has been changed, the style definition information corresponding to the node name.

The method of the present invention further includes the step of replacing the second portion with the first portion in the display attribute information when the second portion and the first portion do not match. Also included in the method is a step of displaying character data for a character data node in accordance with the display attribute information when the character data node is directly associated with the detected node.

The present invention also provides a computer-readable medium encoded with a program for performing structured document display, the program comprising the function of detecting, from structure information corresponding to a structured document, a node having a tag indicating a node name for the node. The program also includes the function of comparing at least a first portion of style definition information with at least a second portion of display attribute information when a display attribute changing flag indicates that a display attribute has been changed, the style definition information corresponding to the node name.

The program encoded on the computer-readable medium of the present invention further includes the function of replacing the second portion with the first portion in the display attribute information when the second portion and the first portion do not match. Also included in the program is the function of displaying character data for a character data node in accordance with the display attribute information when the character data node is directly associated with the detected node.

The present invention further provides a structured document processing system, comprising a storage unit and a display processing unit coupled to the storage unit, the storage unit including a display buffer area. The display processing unit comprises a structure analyzing unit, a document structure memory unit, and an output processing unit.

The structure analyzing unit generates structure information corresponding to a structured document. The document structure memory unit stores the structure information. The output processing unit detects from the structure information a node having a tag indicating a node name for the node and compares at least a first portion of style definition information corresponding to the node name with at least a second portion of display attribute information stored in the display buffer area.

The present invention further provides a structured document apparatus for outputting a document based on structure information about a structured document, the structure information having a tree format. The structured document apparatus comprises a buffer and an output processing unit. The buffer stores display attribute information indicating how to output the structured document. The output processing unit sequentially analyzes nodes in the structure information and, upon reaching a node having style definition information, modifies the display attribute information in the buffer based on the style definition information when the display attribute information and the style definition information do not match.

BRIEF DESCRIPTION OF THE DRAWINGS

FIG. 1A is a diagram showing an example of a structured document including text content in Japanese Kanji;

FIG. 1B is a diagram showing a structured document with English text content equivalent to the text content of the structured document shown in FIG. 1A;

FIG. 2A is a diagram of structure information obtained by analyzing the structured document of FIG. 1A;

FIG. 2B is a diagram of structure information obtained by analyzing the structured document of FIG. 1B;

FIG. 3 is a table of style definition information used in a preferred embodiment of the present invention;

FIG. 6 is a table providing exemplary definitions of the character attribute elements used in the style definition information of FIG. 3.

DESCRIPTION OF THE PREFERRED EMBODIMENT

The present invention provides a method and system for high speed display of structured information and improves the ease of processing large amounts of such structured information. The invention is the result of a continued effort to develop methods and systems for processing of structured documents formed of predetermined elements in a markup language. Such methods and systems are needed in order to promote common use and distribution of information. Typically, the processing requirements for displaying such structured information increase in proportion to the amount of character data contained in the document. The present invention provides high speed processing, including display or printing, of such structured documents.

In accordance with the present invention, a structured document is used to create (or be "replaced with"), at the time of displaying such structured document, structured information such as a tree structure, by analyzing the structure. Namely, at the time of display, a process of tracing the structured information through successive nodes is carried out in accordance with the analysis-generated tree structure. This tracing process, also referred to herein as a "following process," proceeds from an upper node, through to a node having character data.

In the display process, style definition information is obtained when a node having a tag is detected in the process of searching the tree structure. The style definition information is compared with the attribute information currently set to a display buffer area. When the style definition information differs from the attribute information set in the display buffer area, the style definition information is set to the display buffer area.

With this approach, when the structure information for the document has been followed to a node having character data, the necessary display attributes are set to the display buffer area. Once the display attributes are properly set, the display of the character data on the display apparatus may be carried out. The acquisition and setting of display attributes for a structured document such as, for example, that shown in FIG. 2A can therefore be reduced from eleven times to four times.

Figure 4:
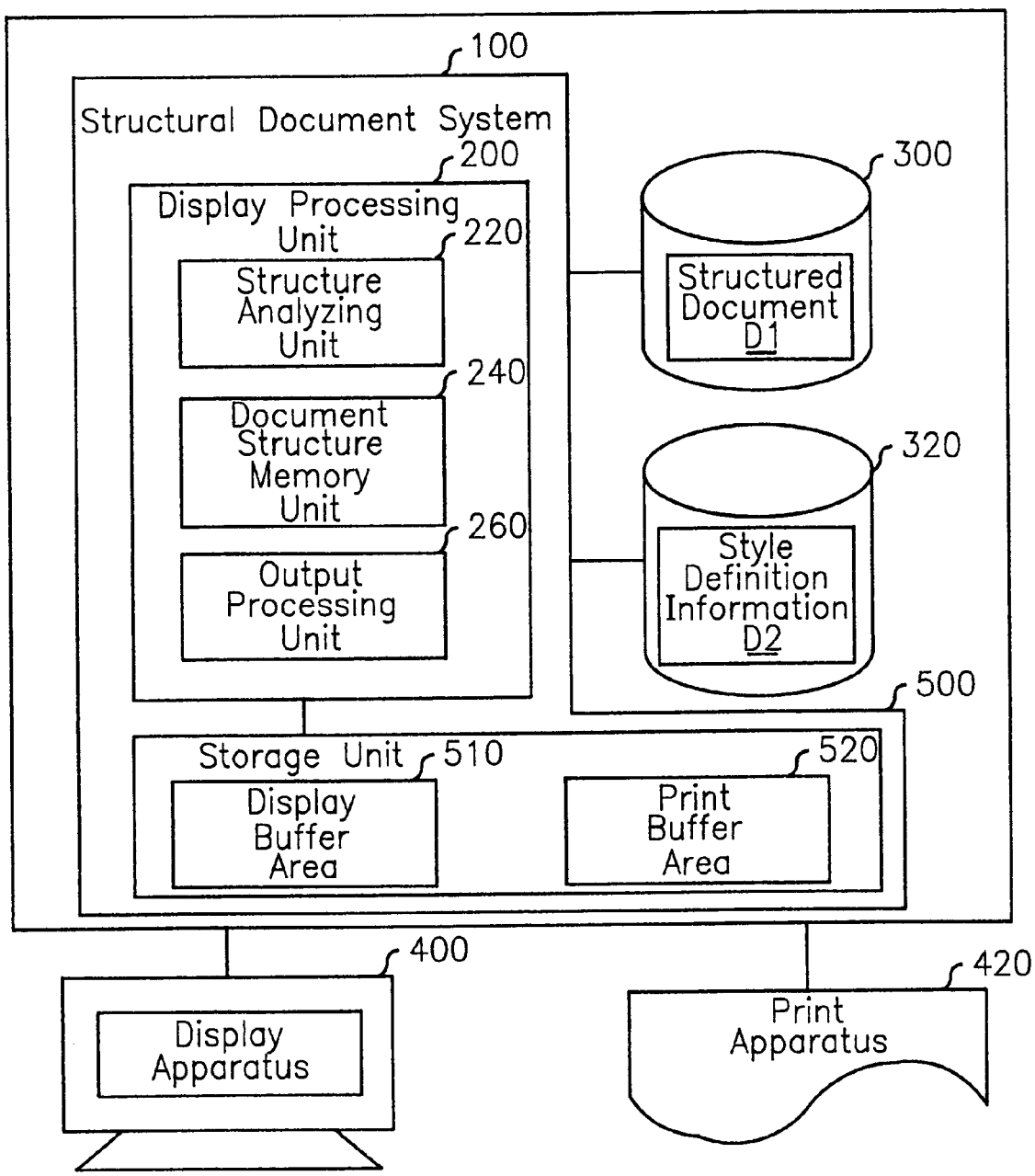
FIG. 4 is a block diagram of a structured document processing according to the preferred embodiment of the present invention.

FIG. 4 is a block diagram showing a structured document processing system 100 embodying the present invention. The structured document System 100 includes a display processing unit 200 that in turn comprises a structure analyzing unit 220, a document structure memory unit 240, and an output processing unit 260. A display method, described hereinafter, is executed in output processing unit 260 of display processing unit 200 of structured document System 100.

Structured document processing system 100 receives from a storage area 300, for example, a structured document D1 conforming to a predetermined specification such as SGML. Display processing unit 200 receives, from a storage area 320, for example, style definition information D2 conforming to a predetermined specification such as the Document Style Semantic and Specification Language (DSSSL). Structured document system 100 displays or prints information to a displaying apparatus 400 or a printing apparatus 420, respectively. Alternatively, structured document system 100 can process and edit the structured document D1.

A storage unit 500 includes a display buffer area 510 and a print buffer area 520. Display buffer area 510 and print buffer area 520 correspond to devices such as, for example, display apparatus 400 and printing apparatus 420. Buffer areas 510 and 520 store attribute information for display or print and character data information being displayed or printed. Alternatively, buffer areas 510 and 520 can be included in separate respective storage units.

Structure analyzing unit 220 analyzes a document, described in SGML, for example, and generates structure information having a structure such as the tree structure shown in FIG. 2A or FIG. 2B. Structure analyzing unit 220 then stores the structure information in document structure memory unit 240. Output processing unit 260 displays the data on display apparatus 400 using the structure information stored in the document structure memory unit 240.

The analysis process performed by structure analyzing unit 220 conforms to International Standard ISO 8879—Standard Generalized Markup Language (SGML). This unit is called an SGML parser. Therefore, a detailed discussion of the structure analysis process is omitted here.

After an instruction has been issued to display (on display apparatus 400) data corresponding, for example, to a structured document (as shown in FIG. 1A or FIG. 1B), display processing unit 100 analyzes, in structure analyzing unit 220, the structure of the designated structured document and then stores the structure information in document structure memory unit 240. Examples of the structure information stored in document structure memory unit 240 are shown in FIGS. 2A and 2B.

Output processing unit 260, which executes a method according to the present invention, will be explained in regard to the processing flow thereof with reference to the flow chart of FIG. 5.

The process begins at step 600. At step 602 it is determined whether more nodes remain to be read from the structure information stored in document structure memory unit 240. If there are more nodes to be read, then at step 605 output processing unit 260 reads a node from unit 240. Next, at step 610, it is determined whether the current node just read ("current node") is a node having a tag. When the current node has a tag, it is determined at step 615 whether the current node is higher than a node read previously thereto. When the current node is higher than the previously read node, then at step 620 it is determined whether a display attribute of display apparatus 400 has been changed. This determination is made by reference to a display attribute changing flag.

If at step 610 it is determined that the supposed node read at step 605 has no tag, then error processing is performed at step 622 and the procedure ends at step 624.

When the value of the display attribute changing flag is "OFF" at step 620, this indicates that the display attributes were not changed by the preceding node and therefore that it is not required to change the display attributes currently set for display apparatus 400. In this case, steps 625 through 650 of the process are not executed. Next, step 655 is executed to detect whether the current node has character data.

Figure 5:
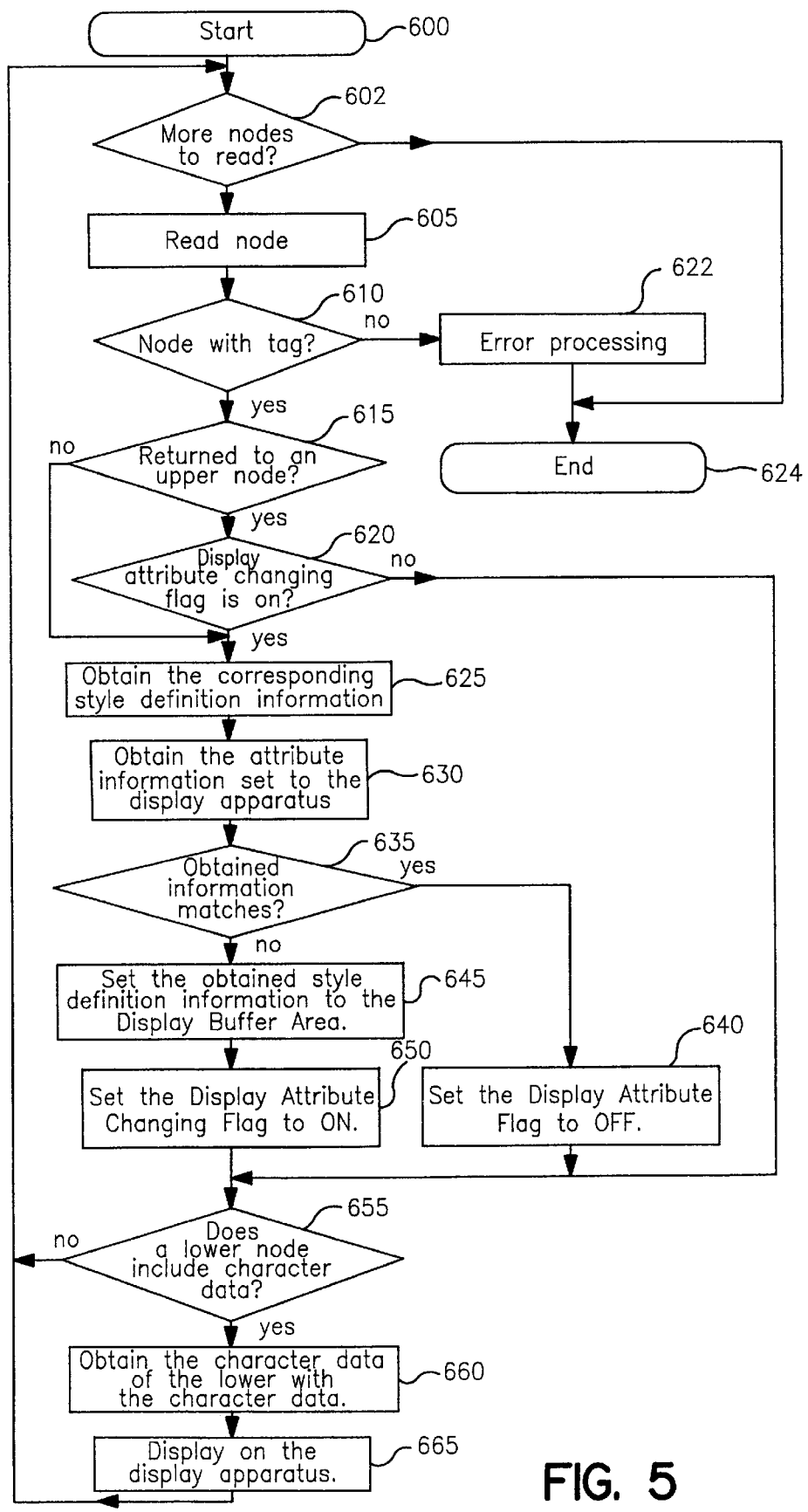
FIG. 5 is a flow chart for displaying a document according to the preferred embodiment of the present invention.

It is noted that, when executing the process of FIG. 5, based on a hierarchical structure such as a tree structure, the search is not always executed only in the lower direction; rather, it is sometimes executed inversely, that is, up to a higher node. In this case, when the display attribute of display apparatus 400 is not changed at a node having a lower tag, it will not be required to change the display attribute of display apparatus 400 when the search is inversely executed up to a node having a higher tag. The display attribute changing flag is used to indicate whether the display attribute of display apparatus 400 has been changed at a preceding lower node when the search of the tree structure is inversely executed up to a higher node. Therefore, when the search is inversely executed up to a higher node, the process as described above to set the display attribute can be omitted, resulting in improved realization of high speed display.

The attribute setting process is not omitted when the result of step 620 is "yes" (the display attribute changing flag is "ON") or when the result at step 615 is "no" (the current node, whose tag is being searched, is in the lower direction). In either case, the process moves to step 625, where attribute information, stored as style definition information D2 on the basis of the tag name, is obtained from storage area 320. Next, at step 630 the display attribute information currently set for display apparatus 400 is obtained. At step 635, the display attributes provided by the style definition information obtained from storage area 320 are compared with the display attributes set for display apparatus 400.

When comparison of these pieces of attribute information indicates that they match, then the currently-set display attributes for display apparatus 400 are not changed and, at step 640, the display attribute changing flag is set to "OFF." If the compared pieces of attribute information differ, then at step 645, the attribute information obtained from style definition information D2 is set to replace the attribute information in display buffer area 510, which changes the display attributes for display apparatus 400. Accordingly, at step 650, the display attribute changing flag is set to "ON."

Next, at step 655, it is determined whether a node having character data is located in a lower position directly associated with the current node. When there is no node having character data located lower than and directly associated with the current node, then the process returns to step 602 and, if more nodes remain to be read, to step 605 where the next node in accordance with the structure information is read. When at step 655 there is a node having character data lower than and directly associated with the current node, then the character data of that node is obtained at step 660. This character data is then set to a character data area of display buffer area 510 and, at step 665, is output to display apparatus 400.

If at step 602 it is determined that no more nodes remain to be read, the again the procedure ends at step 624.

The display attributes for display apparatus 400 are therefore provided by the respective tags of upper nodes that are read before a node having character data is reached. The display of this character data, in turn, depends on the structure information provided by the display attributes that are sequentially set to the display apparatus 400. Therefore, the present invention eliminates the need to search the tags of nodes located above the current node to obtain the display attributes whenever the display process reaches a node having character data. Moreover, the setting of the display attributes to display apparatus 400 is carried out with respect to each node having a tag and not with respect to each node having character data. The number of operations of setting display attributes to display apparatus 400 is reduced, and overall display speed is improved.

A mode of practical operation of the present invention will now be explained with reference to the structure information of FIG. 2A (and FIG. 2B) and the style definition information of FIG. 3 (element D2 in FIG. 4). To facilitate the explanation, the content of the style definition information of FIG. 3 will be described. The style definition information defines the style using the tags of the structured document (element D1 in FIG. 4) as keys.

FIG. 6 provides exemplary definitions for the display attribute elements used in FIG. 3. FIG. 6 lists several character attribute elements as examples of display attribute elements. In particular, the font-size is an element that sets the size of relevant characters for display or printing thereof and is specified by a numeric value indicating units of points. The bold element is an element that sets the shape of characters for display or printing thereof. Whether bold is used is designated with a boolean value. The font-facename element sets the font of characters for display or print thereof and is indicated with a character string. A font name, such as MINCHO or GOTHIC, is specified. The display attributes regarding characters are listed expressly in FIG. 6 for purposes of illustration. However, in practice other pieces of attribute information required for display and print, such as paper size and margins in the case of print output, are also provided.

When a display instruction is issued for the document of FIG. 1A, structure analyzing unit 220 analyzes the structure of the document to generate a tree structure, as shown in FIG. 2A. This tree structure is stored in document structure memory unit 240, from which output processing unit 260 reads the tree structure.

In particular, the most significant node 2-1-1 is read. Since this node has a tag, the style definition information is searched on the tag name "memo" to obtain the attribute information corresponding thereto. In our example, the following definition information is obtained: 12 point for font-size, FALSE for font-bold and GOTHIC for font-facename. Also, the display attributes currently set for display apparatus 400 are obtained. The attribute information obtained from style definition information is compared with the display attribute information currently set in display buffer area 510 for display apparatus 400. If these pieces of display attribute information do not match, then the display attributes of display apparatus 400 are set in display buffer area 510 from the obtained style definition information. In this case, "ON" is set to the display attribute changing flag.

Next, it is determined whether a node having character data is located in a lower position directly associated with node 2-1-1 having the tag "memo." In FIG. 2A, the only node located lower than and directly associated with node 2-1-1 is the node 2-1-2 having the tag "para." Accordingly, the node 2-1-2 having the tag "para" is read as the next node. The style definition information is searched in accordance with the tag name "para," and attribute information corresponding to the tag name "para" is obtained. As indicated in FIG. 3, MINCHO is specified as the font-facename corresponding to the tag name "para." The display attributes set for display apparatus 400, having been set in display buffer area 510 to the style definition information corresponding to the tag name "memo" when the node 2-2-1 was read, differs from the newly obtained style definition information. In order to change the font-facename from GOTHIC to MINCHO, the display attributes are set in display buffer area 510 for display apparatus 400 from the newly obtained style definition information. Accordingly, the display attribute changing flag is set to "ON".

Next, it is determined whether a node including character data is located in a lower position directly associated with the node 2-1-2 having the tag "para." Node 2-1-2, having the tag "para", has nine associated nodes with character data directly. However, because there is a node having a tag, among the nodes directly associated with node 2-1-2, the character data is obtained from only the nodes 2-1-3, 2-1-4, and 2-1-5, which have respective character data representing the Kanji characters illustrated respectively therein. The obtained character data is output to display apparatus 400 through display buffer area 510 and is displayed in accordance with the previously-set display attributes. Namely, the character size is 12 point, the characters are not displayed in Bold, and the three Kanji characters shown in nodes 2-1-3, 2-1-4, and 2-1-5 are displayed together in the MINCHO font.

The node 2-1-6, having the tag "emph," is read and the style definition information is searched for the tag name "emph" to obtain attribute information. For this node name, TRUE is obtained as the setting for the font-bold attribute. The display attributes set in display buffer area 510 include the display attributes set from the node 2-1-1, having the tag "memo," and the display attributes set from the node 2-1-2, having the tag "para." In the case of node 2-1-6, because the font-bold setting specified therein is different, the newly obtained attribute information is set for display apparatus 400 in display buffer area 510. The font-bold setting is thereby changed from FALSE to TRUE. In accordance with this change, the display attribute changing flag is set to "ON".

Next, it is determined whether a node including character data is located in a lower position directly associated with the node 2-1-6 having the tag "emph." In the case of node 2-1-6 having the tag "emph", two nodes having character data are located lower than node 2-1-6 and are directly associated with that node. Character data is therefore obtained for the nodes 2-1-7 and 2-1-8, the respective character data representing the Kanji characters illustrated in nodes 2-1-7 and 2-1-8. This character data is output to display apparatus 400 through display buffer area 510 and is displayed on the basis of the previously set display attributes. Namely, the character size is 12 point, the characters are displayed in Bold, and the two Kanji characters illustrated in nodes 2-1-7 and 2-1-8 are displayed together in the MINCHO font.

Next, the node 2-1-2 is read again, in accordance with the upper position thereof, by execution of an inverse following procedure on the basis of the stored structure information. Because the structure is followed inversely up to the upper position node, whether the display attributes set for display apparatus 400 have been changed at the lower position node is determined from the value of the display attribute changing flag. In the particular case, the display attribute changing flag has the value "ON," because the display attributes were changed at the immediately preceding node 2-1-6 having the tag "emph." Therefore, the corresponding style definition information is obtained for the node name of the current node, as explained above, and the display attributes are then set again in display buffer area 510 for display apparatus 400.

It is then determined whether a node having character data is located in a lower position directly associated with the node 2-1-2 having the tag "para." In this example, the nodes 2-1-9, 2-1-10, 2-1-11, 2-1-12, 2-1-13, and 2-1-14, having further character data representing the Kanji characters illustrated respectively therein, are detected and the respective character data thereby obtained. This character data is output to display apparatus 400 through the display buffer area 510 and is displayed on the basis of the previously set display attributes. Namely, the character size is 12 point, the characters are not displayed in Bold, and the six Kanji characters illustrated in nodes 2-1-9 through 2-1-14 are displayed together in the MINCHO font.

Display processing unit 200 carries out a similar process when the document to be displayed is the English structured document of FIG. 1B. In particular, in the tree structure shown in FIG. 2B, nodes 2-2-1 and 2-2-2 correspond respectively to nodes 2-1-1 and 2-1-2 of FIG. 1A. Nodes 2-2-3, 2-2-4, 2-2-5, 2-2-6, 2-2-7, and 2-2-8 have English character data "T," "o," "d," "a," "y," and "0" (space), respectively, but the display process described above with respect to nodes 2-1-3, 2-1-4, and 2-1-5 carries over directly. In a similar manner, nodes 2-2-10 through 2-2-18 correspond in the process to nodes 2-1-7 and 2-1-8, and nodes 2-2-19 through 2-2-26 correspond to nodes 2-1-9 through 2-1-14.

Thus, each step in the process detailed above with respect to the structured document of FIGS. 1A and 2A applies equally well to the structured document of FIGS. 1B and 2B. The present invention in fact applies to display and printing of any such structured document, whether the document has text content in Japanese Kanji, English, or another written language.

The embodiment of the present invention discussed above has been presented for purposes of explanation in the exemplary content of displaying or printing. It is noted, however, that the data which can be similarly processed and displayed by a display apparatus connected to a computer can include such data as image data, including stationary image data or moving image data. In such a case, for the corresponding style definition information, the attribute information required for display is of course defined.

It is also noted that the embodiment discussed above has been explained mainly in the context of a display apparatus such as a display unit. However, the attribute information may also be set to printing apparatus 420 to print the data on paper or other media.

Although a few preferred embodiments of the present invention have been shown and described herein, it will be appreciated by and apparent to those skilled in the art that changes may be made in these embodiments without departing from the principles and spirit of the invention, the scope of which is defined in the claims appended hereinbelow including the equivalents of the subject matter recited therein.

What is claimed is:

1. A method of displaying a structured document, comprising:

comparing style definition information corresponding to a tag to display attribute information when a node having the tag is searched toward a lower rank, and setting the style definition information to the display attribute information in a display buffer area and setting content indicating update of information to a display attribute update flag, when the style definition information is different from the display attribute information;

determining whether content indicating update of information is set to the display attribute update flag when the node having the tag is searched toward an upper rank, and again setting content of the style definition information corresponding to said tag to the display attribute information of the display buffer area only when content indicating update of information is set; and displaying, based on the display attribute information, character information of a character node in the lower rank included in the node having said tag.

2. The method of claim 1, further comprising obtaining the style definition information from a storage area.

3. The method of claim 1, further comprising obtaining the display attribute information from the display buffer area.

4. The method of claim 3, further comprising storing style definition information in the display buffer area when the display attribute information is modified based on the style definition information.

5. The method of claim 1, further comprising setting the display attribute changing flag to indicate that a display attribute has been changed when the display attribute information has been modified based on the style definition information.

6. The method of claim 1, further comprising displaying character data of a character data node when structure information directly associates the character data node with the node having the tag.

7. The method of claim 1, further comprising comparing the style definition information with the display attribute information when the node having the tag is an upper node with respect to a previously searched node having a tag.

8. The method of claim 1, wherein the comparing operation compares a first portion within the style definition information with a second portion within the display attribute information.

9. The method of claim 1, further comprising setting the display attribute changing flag to indicate that no display attribute has been changed when a result of the comparing operation indicates that the style definition information matches the display attribute information.

10. The method of claim 1, further comprising obtaining the display attribute information from a print buffer area.

11. The method of claim 10, further comprising storing specified style definition information to the print buffer area when the display attribute information is replaced with the specified style definition information.

12. A computer-readable medium encoded with a program for performing structured document display, said program comprising instructions for:

comparing style definition information corresponding to a tag to display attribute information when a node having the tag is searched toward a lower rank, and setting the style definition information to the display attribute information in a display buffer area and setting content indicating update of information to a display attribute update flag, when the style definition information is different from the display attribute information;

determining whether content indicating update of information is set to the display attribute update flag when the node having the tag is searched toward an upper rank, and again setting content of the style definition information corresponding to said tag to the display attribute information of the display buffer area only when content indicating update of information is set when the style definition information does not match the relevant portion of the display attribute information, modifying the display attribute information in accordance with the style definition information; and displaying, based on the display attribute information, character information of a character node in the lower rank included in the node having said tag.

13. The computer-readable medium of claim 12, wherein said program further comprises one or more instructions for obtaining the style definition information from a storage area.

14. The computer-readable medium of claim 12, wherein said program further comprises one or more instructions for obtaining the display attribute information from the display buffer area.

15. The computer-readable medium of claim 12, wherein said program further comprises one or more instructions for storing style definition information in the display buffer area when the display attribute information is modified based on the style definition information.

16. The computer-readable medium of claim 12, wherein said program further comprises one or more instructions for setting the display attribute changing flag to indicate that a display attribute has been changed when the display attribute information has been modified based on the style definition information.

17. The computer-readable medium of claim 12, wherein said program further comprises one or more instructions for displaying character data for a character data node when structure information directly associates the character data node with the node having the tag.

18. The computer-readable medium of claim 12, wherein said program further comprises one or more instructions for setting the display attribute changing flag to indicate that no display attribute has been changed when a result of executing said instructions for comparing indicates that the style definition information matches the display attribute information.

19. A structured document processing system, comprising:

a buffer that stores display attribute information; and a display processing unit coupled to said storage unit, said display processing unit comprising:

a structure analyzing unit that generates structure information having nodes corresponding to a structured document;

a document structure memory unit that stores the structure information; and an output processing unit;

wherein said output processing unit:

compares style definition information corresponding to a tag to the display attribute information when a node having the tag is searched toward a lower rank, and sets the style definition information to the display attribute information in the buffer and sets content indicating update of information to the display attribute update flag, when the style definition information is different from the display attribute information; and determines whether content indicating update of information is set to a display attribute update flag when the node having the tag is searched toward an upper rank, and again sets content of the style definition information corresponding to said tag to the display attribute information of the display buffer area only when content indicating update of information is set.

20. The system of claim 19, wherein said output processing unit replaces the display attribute information in the buffer with the style definition information when the style definition information does not match the display attribute information.

21. The system of claim 20, wherein said output processing unit sets the display attribute changing flag when a display attribute has been changed.

22. A structured document apparatus for outputting a document based on structure information about a structured document, the structure information having a tree format, said structured document apparatus comprising:

a buffer that stores display attribute information indicating how to output the structured document; and an output processing unit;

wherein said output processing unit:

compares style definition information corresponding to a tag to the display attribute information when a node having the tag is searched toward a lower rank, and sets the style definition information to the display attribute information in the buffer and sets content indicating update of information to the display attribute update flag, when the style definition information is different from the display attribute information; and determines whether content indicating update of information is set to a display attribute update flag when the node having the tag is searched toward an upper rank, and again sets content of the style definition information corresponding to said tag to the display attribute information of the display buffer area only when content indicating update of information is set.

* * * * *

UNITED STATES PATENT AND TRADEMARK OFFICE
CERTIFICATE OF CORRECTION

| | |
|---|---|
| PATENT NO. | : 6,175,843 B1 |
| DATED | : January 16, 2001 |
| INVENTOR(S) | : Takahide Muramoto et al. |

Page 1 of 1

It is certified that error appears in the above-identified patent and that said Letters Patent is hereby corrected as shown below:

Title page, item [54],
Change the title to --METHOD AND SYSTEM FOR DISPLAY OF A STRUCTURED DOCUMENT USING STRUCTURED DISPLAY INFORMATION --

Column 1,
Delete lines 1-2 and substitute the following title -- METHOD AND SYSTEM FOR DISPLAY OF A STRUCTURED DOCUMENT USING STRUCTURED DISPLAY INFORMATION --.

Signed and Sealed this

Second Day of October, 2001

Attest:

*Nicholas P. Godici*

NICHOLAS P. GODICI
*Attesting Officer*    *Acting Director of the United States Patent and Trademark Office*